United States Patent Office 2,784,206
Patented Mar. 5, 1957

2,784,206

METALLO VINYLPHOSPHONATES

David H. Chadwick, Webster Groves, Mo., assignor to Monsanto Chemical Company, St. Louis, Mo., a corporation of Delaware No Drawing. Application June 13, 1955,
Serial No. 515,235

10 Claims. (Cl. 260—429)

This invention relates to new and useful compounds and to the preparation of same.

The new compounds of this invention are metallo vinylphosphonates of the structural formula

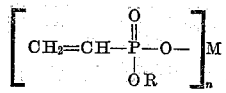

where R is an alkyl radical containing 1 to 6 carbon atoms, where M is a metal having a valence greater than 1, and where $n$ is the valence of the metal. As illustrative of R are the methyl, ethyl, propyl, butyl, amyl and hexyl radicals either of the branched chain alkyl or straight chain alkyl types. As illustrative of M are magnesium, calcium, zinc, strontium, cadmium, barium, aluminum, copper, iron, cobalt and nickel. A preferred group of metals are those of group II of the periodic table.

These new compounds are useful for a variety of purposes. For example, as stabilizers with respect to the thermodiscoloration of polymers of acrylonitrile. As particularly illustrative of metal salts of this invention useful for this purpose are salts of the foregoing structure where M is calcium, magnesium, strontium and aluminum. The new compounds are also useful as light stabilizers for polyvinyl chloride and similar halogenated vinylidene resins. The cadmium salts have been found to be exceptionally useful in this respect.

As illustrative of the preparation of the new compounds of this invention is the following:

Example I

To a suitable reaction vessel equipped with a vent leading to a Dry Ice trap is added approximately 11.1 parts by weight of calcium chloride and approximately 35.5 parts by weight of diethyl vinylphosphonate $$[CH_2=CHPO(OC_2H_5)_2]$$

The mix is heated in an oil bath at a temperature of 160–165° C. for about 30 minutes. The white solid so obtained on cooling is slurried with ethyl alcohol, filtered and air dried. A yield of 23 parts by weight of calcium ethyl vinylphosphonate

is obtained.

Example II

To a suitable reaction vessel is added approximately 11.1 parts by weight of calcium chloride and approximately 44 parts by weight of di-n-butyl vinylphosphonate $[CH_2=CHPO(OC_4H_9)_2]$. The mix is heated in an oil bath at a temperature of about 190° C. for about 2 hours. The reaction product so obtained on cooling is slurried with ethyl alcohol, filtered and dried under vacuum. A good yield of calcium n-butyl vinylphosphonate

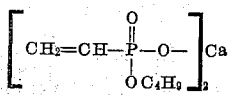

is obtained.

Example III

To a suitable reaction vessel is added approximately 11.1 parts by weight of calcium chloride and approximately 50 parts by weight of di-isoamyl vinylphosphonate $[CH_2=CHPO(OC_5H_{11})_2]$. The mix is heated in an oil bath at a temperature of about 200° C. for about 4 hours. The reaction product so obtained on cooling is slurried with ethyl alcohol, filtered and dried under vacuum. A good yield of calcium isoamyl vinylphosphonate

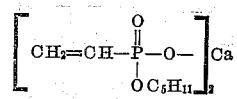

is obtained.

Example IV

To a suitable reaction vessel equipped with a vent leading to a Dry Ice trap is added approximately 36.6 parts by weight of cadmium chloride and approximately 63.6 parts by weight of diethyl vinylphosphonate $$[CH_2=CHPO(OC_2H_5)_2]$$

The mix is heated in an oil bath at a temperature of about 165–170° C. for about 30 minutes. The temperature is increased to about 180° C. and maintained at that temperature for about 4½ hours. The white solid so obtained on cooling is slurried with hot ethyl alcohol, diluted with isopropanol, filtered and air dried. A yield of 16.8 parts by weight of cadmium ethyl vinylphosphonate

is obtained.

Example V

To a suitable reaction vessel is added approximately 36.6 parts by weight of cadmium chloride and approximately 76.8 parts by weight of di-isopropyl vinylphosphonate $[CH_2=CHPO(OC_3H_7)_2]$. The mix is heated in an oil bath at a temperature of about 175° C. for about 7 hours. The reaction product so obtained on cooling is slurried with hot ethyl alcohol, cooled, filtered and air dried. A good yield of cadmium isopropyl vinylphosphonate

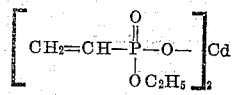

is obtained.

Example VI

To a suitable reaction vessel is added approximately 36.6 parts by weight of cadmium chloride and approximately 100 parts by weight of di-n-amyl vinylphosphonate $[CH_2=CHPO(OC_5H_{11})_2]$. The mix is heated in an oil bath at a temperature of about 200° C. for about 8 hours. The reaction product so obtained on cooling is slurried with hot ethyl alcohol, cooled, filtered and vacuum dried. A good yield of cadmium n-amyl vinylphosphonate

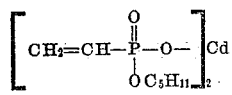

is obtained.

*Example VII*

To a suitable reaction vessel equipped with a vent leading to a Dry Ice trap is added approximately 27.3 parts by weight of zinc chloride and approximately 65.6 parts by weight of diethyl vinylphosphonate, $$[CH_2=CHPO(OC_2H_5)_2]$$

The mix is heated in an oil bath at a temperature of about 165–170° C. until the evolution of ethyl chloride ceases. The reaction produce so obtained on cooling is slurried with ethyl alcohol, filtered and air dried. A good yield of zinc ethyl vinylphosphonate

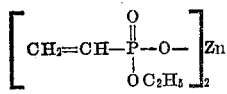

is obtained.

*Example VIII*

To a suitable reaction vessel equipped with a vent leading to a Dry Ice trap is added approximately 41.7 parts by weight of barium chloride and approximate 65.6 parts by weight of diethyl vinylphosphonate $$[CH_2=CHPO(OC_2H_5)_2]$$

The mix is heated in an oil bath at a temperature of about 165–170° C. until the evolution of ethyl chloride ceases. The reaction produce so obtained on cooling is slurried with ethyl alcohol, filtered and air dried. A good yield of barium ethyl vinylphosphonate

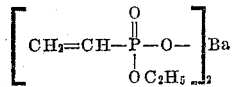

is obtained.

Admixing the following phosphonate ester reactants and metal halide reactants and heating at a temperature in the range of 150–225° C., the following metallo vinylphosphonates are obtained:

| Ester Reactant $CH_2=CH-\overset{O}{\underset{(OR)_2}{P}}$ R | Metal Halide | Metallo Vinyl Phosphonate $\left[CH_2=CH-\overset{O}{\underset{OR}{P}}-O\right]_n M$ | | |
|---|---|---|---|---|
| | | R | M | n |
| $CH_3$ | $BaCl_2$ | $CH_3$ | Ba | 2 |
| $CH_3$ | $CdCl_2$ | $CH_3$ | Cd | 2 |
| $CH_3$ | $ZnCl_2$ | $CH_3$ | Zn | 2 |
| $C_2H_5$ | $MgCl_2$ | $C_2H_5$ | Mg | 2 |
| $n\text{-}C_3H_7$ | $ZnCl_2$ | $n\text{-}C_3H_7$ | Zn | 2 |
| $n\text{-}C_3H_7$ | $CdCl_2$ | $n\text{-}C_3H_7$ | Cd | 2 |
| $iso\text{-}C_3H_7$ | $SrCl_2$ | $iso\text{-}C_3H_7$ | Sr | 2 |
| $n\text{-}C_4H_9$ | $CdCl_2$ | $n\text{-}C_4H_9$ | Cd | 2 |
| $iso\text{-}C_4H_9$ | $ZnCl_2$ | $iso\text{-}C_4H_9$ | Zn | 2 |
| $iso\text{-}C_4H_9$ | $BaCl_2$ | $iso\text{-}C_4H_9$ | Ba | 2 |
| $iso\text{-}C_5H_{11}$ | $ZnCl_2$ | $iso\text{-}C_5H_{11}$ | Zn | 2 |
| $iso\text{-}C_5H_{11}$ | $MgBr_2$ | $iso\text{-}C_5H_{11}$ | Mg | 2 |
| $n\text{-}C_6H_{13}$ | $CdCl_2$ | $n\text{-}C_6H_{13}$ | Cd | 2 |

While this invention has been described with respect to certain embodiments it is not so limited and it is to be understood that variations and modifications thereof obvious to those skilled in the art may be made without departing from the spirit or scope of this invention.

What is claimed is:

1. Salts of the structural formula

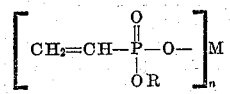

where R is an alkyl radical containing 1 to 6 carbon atoms, where M is a metal selected from the group consisting of copper, iron, cobalt, nickel, aluminum, and metals of group II of the periodic table, and where $n$ is the valence of the metal.

2. Salts of the structural formula

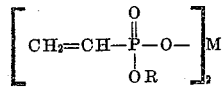

where R is an alkyl radical containing 1 to 6 carbon atoms and where M is a member of group II of the periodic table.

3. Salts of claim 2 wherein M is an alkaline earth metal.

4. Salts of claim 2 wherein M is barium.
5. Salts of claim 2 wherein M is calcium.
6. Salts of claim 2 wherein M is cadmium.
7. Salts of claim 2 wherein M is zinc.
8. Cadmium ethyl vinylphosphonate.
9. Calcium ethyl vinylphosphonate.
10. The method of making the compounds of claim 2, which comprises reacting at a temperature in the range of about 150° C. to about 225° C. a member of the group consisting of a chloride and bromide of a metal of group II of the periodic table with a dialkyl vinylphosphonate wherein the respective alkyl groups of the said phosphonate contain 1 to 6 carbon atoms.

References Cited in the file of this patent

UNITED STATES PATENTS 2,636,027    Coover et al. _____ Apr. 21, 1953